US012130802B2

(12) United States Patent
Dong

(10) Patent No.: US 12,130,802 B2
(45) Date of Patent: *Oct. 29, 2024

(54) SYSTEMS AND METHODS FOR MULTI-NODAL STREAM PROCESSING FRAMEWORK FOR PARTITIONED DATABASE

(71) Applicant: COUPANG CORP., Seoul (KR)

(72) Inventor: Bin Dong, Beijing (CN)

(73) Assignee: Coupang Corp., Seoul (KR)

( * ) Notice: Subject to any disclaimer, the term of this patent is extended or adjusted under 35 U.S.C. 154(b) by 343 days.

This patent is subject to a terminal disclaimer.

(21) Appl. No.: 17/581,741

(22) Filed: Jan. 21, 2022

(65) Prior Publication Data

US 2022/0284010 A1 Sep. 8, 2022

Related U.S. Application Data

(63) Continuation of application No. 17/189,816, filed on Mar. 2, 2021, now Pat. No. 11,263,206.

(51) Int. Cl.
*G06F 16/23* (2019.01)
*G06F 7/14* (2006.01)
(Continued)

(52) U.S. Cl.
CPC ............ *G06F 16/2379* (2019.01); *G06F 7/14* (2013.01); *G06F 9/541* (2013.01);
(Continued)

(58) Field of Classification Search
None
See application file for complete search history.

(56) References Cited

U.S. PATENT DOCUMENTS 5,943,424 A 8/1999 Berger et al.
6,886,101 B2 4/2005 Glazer et al.
(Continued)

FOREIGN PATENT DOCUMENTS

JP 2013522778 A 6/2013
JP 2015514247 A 1/2015
(Continued)

OTHER PUBLICATIONS

Taiwanese Office Action and Search Report dated Jan. 19, 2023, in counterpart Taiwanese Patent Application No. 111107356, (25 pages).
(Continued)

*Primary Examiner* — Richard L Bowen
(74) *Attorney, Agent, or Firm* — FINNEGAN, HENDERSON, FARABOW, GARRETT & DUNNER, LLP

(57) ABSTRACT

A computer-implemented system and method for generating a data transaction log is disclosed. The method has the steps of: generating a registry; maintaining at least one data source agent, each data source agent being configured to: query the registry to receive an address of the one or more first data table; receiving, in response to the query, the at least one transaction logs from at least one first storage, wherein each transaction log is associated with a transaction time; compiling one or more modified transaction logs; and maintaining at least one streaming process, each streaming process being configured to: generate the at least one second data table based on the modified transaction logs for storage in the at least one second storage; and generate display based on the at least one second data table.

20 Claims, 9 Drawing Sheets

(51) Int. Cl.

| | |
|---|---|
| *G06F 9/54* | (2006.01) |
| *G06F 16/22* | (2019.01) |
| *G06F 16/245* | (2019.01) |
| *G06F 16/2455* | (2019.01) |
| *G06F 16/25* | (2019.01) |
| *G06Q 10/08* | (2024.01) |
| *G06Q 10/10* | (2023.01) |
| *G06Q 30/0601* | (2023.01) |

(52) U.S. Cl.
CPC ...... *G06F 16/2282* (2019.01); *G06F 16/2358* (2019.01); *G06F 16/245* (2019.01); *G06F 16/24554* (2019.01); *G06F 16/254* (2019.01); *G06F 16/258* (2019.01); *G06Q 10/08* (2013.01); *G06Q 10/10* (2013.01); *G06Q 30/0601* (2013.01)

(56) References Cited

U.S. PATENT DOCUMENTS

| | | | |
|---|---|---|---|
| 10,581,990 | B2 | 3/2020 | Ruckart et al. |
| 2005/0027725 | A1 | 2/2005 | Kagalwala et al. |
| 2005/0240531 | A1 | 10/2005 | Wolff, Jr. |
| 2006/0085275 | A1 | 4/2006 | Stokes et al. |
| 2011/0040839 | A1 | 2/2011 | Zabalan |
| 2012/0246303 | A1 | 9/2012 | Petersen et al. |
| 2016/0094448 | A1* | 3/2016 | Peacock ................ G06F 16/137 709/243 |
| 2017/0109636 | A1 | 4/2017 | Marcu et al. |
| 2019/0370810 | A1 | 12/2019 | Hu et al. |

FOREIGN PATENT DOCUMENTS

| | | |
|---|---|---|
| KR | 20070058281 A | 6/2007 |
| KR | 100857036 B1 | 9/2008 |
| KR | 20120099335 A | 9/2012 |
| KR | 20200100173 A | 8/2020 |
| TW | 1280024 B | 4/2007 |
| TW | 202042218 A | 11/2020 |
| TW | 202107377 A | 2/2021 |
| TW | 1830162 B | 1/2024 |
| WO | WO 2013/091167 A1 | 6/2013 |

OTHER PUBLICATIONS

Baer, Hermann et al., Oracle Database VLDB and Partitioning Guide, 11g Release 2 (11.2), Sep. 2011, Copyright © 2008, 2011, Oracle and/or its affiliates, 310 pgs.

Braubach, Lars et al., "A Novel Distributed Registry Approach for Efficient and Resilient Service Discovery in Megascale Distributed Systems," *Computer Science and Information Systems* 15(3):751-774, 2018, vol. 15, Issue 3, https://doi.org/10.2298/CSIS180131030B, 25 pgs.

Lane, Paul, Oracle Database Data Warehousing Guide, 11g Release 1 (11.1), Sep. 2007, Copyright © 2011, 2007, Oracle, 584 pgs.

PCT Notification of Transmittal of the Internal Search Report and the Written Opinion of the International Searching Authority, or the Declaration, issued in International Patent Application No. PCT/IB2021/052951, mailed on Nov. 18, 2021, 10 pgs.

Raichelson, Lihi et al., "Merging Event Logs with Many to Many Relationships," *Business Prcess Management Workshops*, pp. 330-341, Sep. 7, 2014, DOI: 10.1007/978-3-319-15895-2, 12 pgs.

Webpage captured of Google search: "Database API gelog," Oct. 13, 2021, Google, 2 pgs.

Taiwanese Rejection Decision mailed Jun. 27, 2023, in counterpart Taiwanese Patent Application No. 111107356, (6 pages).

Korean Notice of Allowance mailed Apr. 5, 2023, in counterpart Republic of Korea Patent Application No. 10-2021-0150847, (4 pages).

Korean Office Action dated Jan. 13, 2023, in counterpart Republic of Korea Patent Application No. 10-2021-0150847, filed Nov. 4, 2021 (6 pages).

Taiwanese Office Action and Search Report mailed Apr. 26, 2024, in counterpart Taiwanese Patent Application No. 112150207, (7 pages).

* cited by examiner

Favorites  Application                                               login  Sign Up  Service center

[ all ]

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese

285 Reviews    20,000 won

FREE Shipping
Tomorrow (Wed) 11/28 Arrival Guarantee

Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and Content reference | | nutrient | None |

FIG. 1C

SYSTEMS AND METHODS FOR MULTI-NODAL STREAM PROCESSING FRAMEWORK FOR PARTITIONED DATABASE

This application is a continuation of co-pending U.S. patent application Ser. No. 17/189,816, filed Mar. 2, 2021, which is incorporated herein by reference.

TECHNICAL FIELD

The present disclosure generally relates to computerized systems and methods for multi-nodal stream processing. In particular, embodiments of the present disclosure relate to inventive and unconventional systems for multi-nodal stream processing framework for partitioned databases.

BACKGROUND

In the field of on-line retail business, enormous number of transactions takes place as a large base of users interact with the computer systems of the on-line retail business. Data associated with of these transactions can be stored in various databases, and these data may be used to perform analysis to gain useful insight regarding the on-line retail business. In some instances, these data may occupy terabytes or petabytes of memory, and can only be practically stored among many databases and/or server machines.

In certain circumstances, these data may be used to generate reports. For example, to obtain a business insight from these data stored in the databases, systems and methods may be utilized to retrieve, process, and transform these data into business information for user consumption in near-real time. For example, such data may be streamed in time to be viewed by user to gain insight into the change and movements of data points. This may be accomplished by methods known as stream processing. Rather than performing batch processing of all of these data involved, which may be time consuming when the data are large in size, streaming allows only changes or updates of the data to be processed. Examples of stream processing may include Apache Flink. Changes or updates to the data may be referred to as transaction logs. For example, in MySQL, such transaction logs are called binlog.

Conventional stream processing methods and systems, however, may be inefficient when operating in environment where data involved is large. For example, as the amount of data being generated increase during operation of the on-line retail system, existing storage may be insufficient. In such cases, additional storage capacity may be brought on-line, and some portions of the already stored data may be rearranged. Conventional stream processing methods and systems cannot compensate for this rearrangement. Recoding, reprogramming, rebuilding, and/or re-deployment of stream processing methods and systems is typically required.

The systems and methods of the present disclosure solve one or more of the problems set forth above and/or other problems of the prior art.

SUMMARY

One aspect of the present disclosure is directed to a computer-implemented system for generating a data transaction log, the system comprising: at least one first storage storing at least one first data table, the at least one first data table including at least one transaction log and being associated with first nodes; at least one second storage for storing at least one second data table; at least one processor configured to execute the steps of: generating a registry; maintaining at least one data source agent, each data source agent being configured to: query the registry to receive an address of the one or more first data table; receiving, in response to the query, the at least one transaction logs from at least one first storage, wherein each transaction log is associated with a transaction time; compiling one or more modified transaction logs; and maintaining at least one streaming process, each streaming process being configured to: generate the at least one second data table based on the modified transaction logs for storage in the at least one second storage; and generate display based on the at least one second data table.

Another aspect of the present disclosure is directed to a computer-implemented method for a system for generating data transaction log, the system comprising: at least one first storage storing at least one first data table, the at least one first data table including at least one transaction log and being associated with first nodes; at least one second storage for storing at least one second data table; at least one processor configured to execute the steps of: generating a registry; maintaining at least one data source agent, each data source agent being configured to: query the registry to receive an address of the one or more first data table; receiving, in response to the query, the at least one transaction logs from at least one first storage, wherein each transaction log is associated with a transaction time; compiling one or more modified transaction logs; and maintaining at least one streaming process, each streaming process being configured to: generate the at least one second data table based on the modified transaction logs for storage in the at least one second storage; and generate display based on the at least one second data table.

Yet another aspect of the present disclosure is directed to a system for generating data transaction log, the system comprising: a plurality of first storage storing at least one first data table, the at least one first data table includes one or more transaction logs and is characterized by one of more first nodes; at least one second storage storing at least one second data table; a display interface; at least one processor configured to execute the steps of: generating a registry; maintaining a plurality of data source agents distributed across a plurality of resource nodes, each of the data source agents being configured to: query the registry to receive a distribution of the at least one first data table; receiving, based on the query, the at least one transaction logs from at least one first storage, wherein each transaction log is associated with a transaction time; compiling one or more modified transaction logs; and maintaining a plurality of streaming processes distributed across the plurality of resource nodes, each of the streaming processes being configured to: generate the at least one second data table for storage in the at least one second storage; generate display based on the at least one second data table, wherein: each of the streaming process in a resource receives the one or more modified transaction logs from a corresponding data source agent in the same resource node.

Other systems, methods, and computer-readable media are also discussed herein.

BRIEF DESCRIPTION OF THE DRAWINGS

FIG. 1C depicts a sample Single Detail Page (SDP) that includes a product and information about the product along with interactive user interface elements, consistent with the disclosed embodiments.

DETAILED DESCRIPTION

Figure 1A:
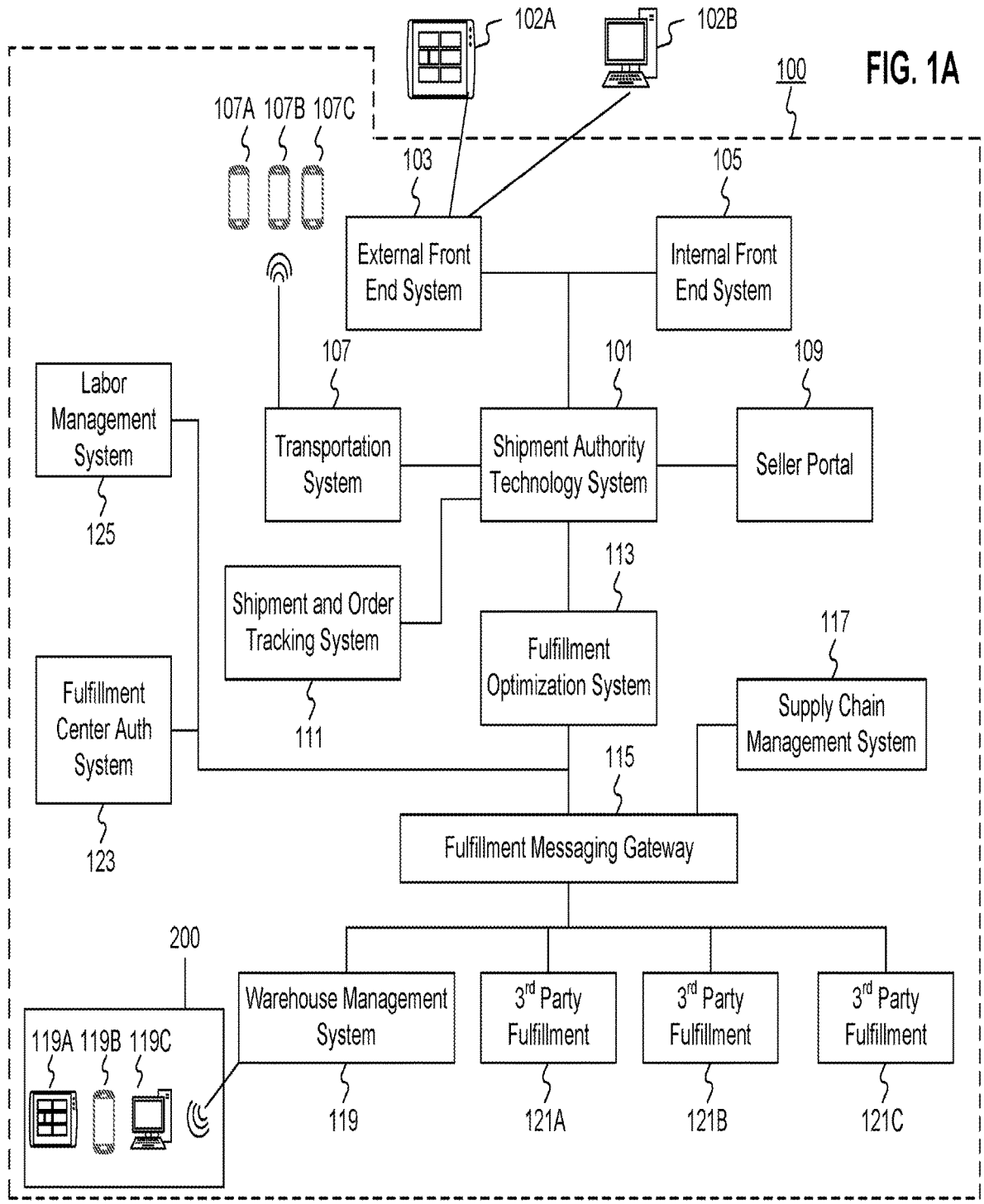
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
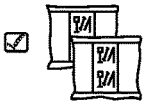
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
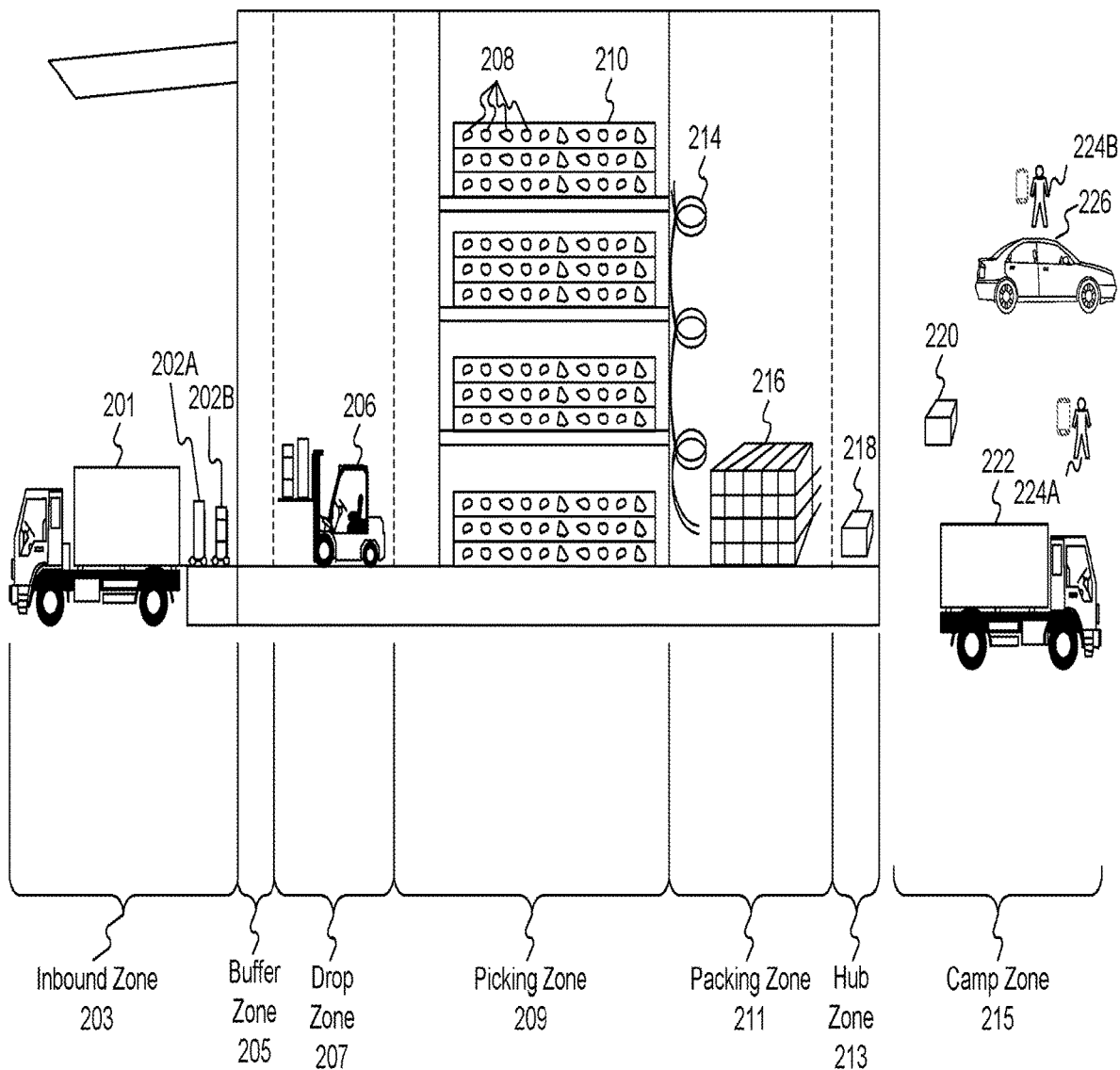
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to some embodiments, there is provided a system for generating data transaction log. For example, internal front end system 105 may be an example of the system for generating data transaction log and configured to enable internal users to view diagnostic and statistical information about orders, modify item information, review statistics relating to orders, or view other real-time data changes and updates of system 105. In some embodiments, internal front end system 105 may host software applications for batch processing and streaming processing of data stored on one or more databases. Batch processing may refer to scanning the entire set of data stored in the one or more databases hourly, daily, weekly, daily, or at other time intervals to generate relevant data for user consumption. Examples of batch processing software application may include Hadoop, Mapreduce, or Spark.

Since time interval between batch processing may require users to wait for a potentially extended time period to receive relevant data, internal front end system 105 may perform streaming processing to handle any changes in the relevant data in real-time, in between the batch processing. An example of streaming processing software application may include Apache Flink, Kafka Streaming, Spark Streaming and Storm, and other similar data streaming platforms known in the art. Internal front end system 105 may perform streaming processing continuously to supply changes in relevant data to users in real time. The changes in the relevant data from the one or more databases may be referred to as transaction logs. For example, in between batch processing of data in the database, a shopper may complete a shopping action using system 100. Rather than processing the entirety of the databases relating to the shopper actions when new data is added (or old data removed), this transaction may be recorded in a transaction log relating to shopping data. Thus, by monitoring the transaction logs, real-time activity of system 100 may be evaluated.

Thus, internal front end system 105 may continuously retrieve and parse the transaction logs to supply real time data for user consumption. By way of example, in a database environment such as MySQL, such transaction logs are called binlogs. In some embodiments, transaction logs may be stored in table formats in databases that are horizontally partitioned. Examples of horizontally partitioned databases may include Sharding databases, which will be further described below. In some embodiments, internal front end system 105 may be implemented in a plurality of distributed sever machines, or in virtual server machines in a cloud computing environment, where multiple streaming processing may be executed in parallel, in conjunction, or independent or other streaming processing. For example, in order to increase data processing ability or throughput, internal front end system 105 may execute streaming processing software application in different server machines or virtual server machines.

Figure 3:
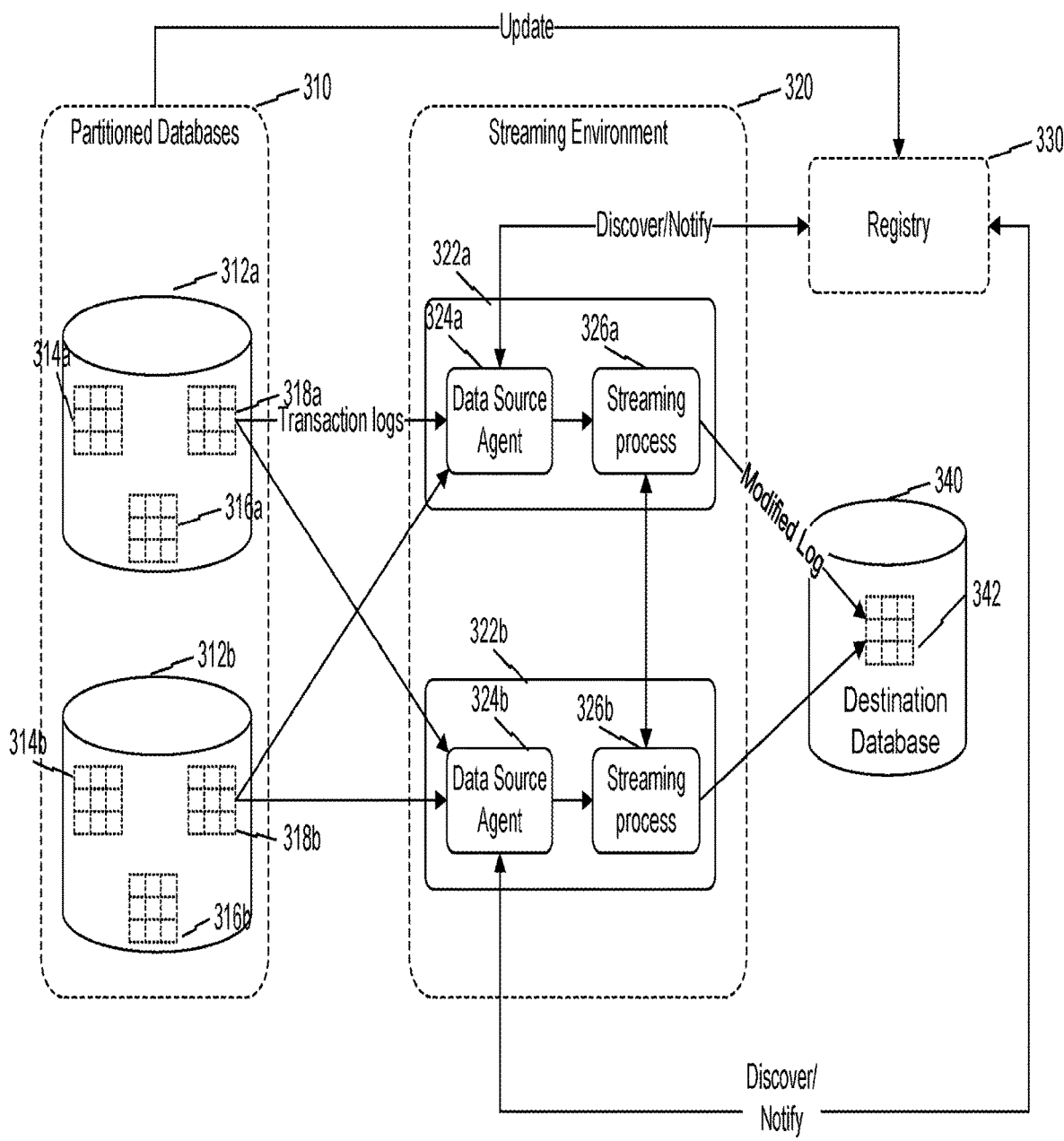
FIG. 3 is a schematic diagram of an exemplary system including multi-nodal stream processing framework for partitioned databases, consistent with the disclosed embodiments.

By way of example, FIG. 3 depicts a diagram of system 300, which is an exemplary system including multi-nodal stream processing framework for partitioned databases, consistent with the disclosed embodiments. System 300 may include partitioned databases 310, streaming environment 320, registry 330, and destination database 340.

In some embodiments, partitioned databases 310 may be examples of first storage. Partitioned databases 310 may be include a plurality of database nodes, such as node 312a, node 312b, etc. In some embodiments, each node, such as node 312a or node 312b may be a distinct data storage device. In alternative embodiments, such as in cloud computing context, each node such as node 312a or 312b may represent memory nodes, embodied across a plurality of server machines or virtual server. In some embodiments, the nodes represent a partition strategy of partitioned database 310. Partition strategy may refer to the algorithm governing a partitioning process.

Partitioning, may also be known as Sharding in the art, may refer to a method or process of dividing a single set of data into multiple sets or subsets. For example, when data are stored in a table having rows and columns, vertical partitioning may refer to dividing the table vertically (i.e., dividing the table by columns), while horizontal partitioning may refer to dividing the table horizontally (i.e., dividing the table by rows). By way of example, a table storing data having 100 rows may be partitioned into two partitioned tables, the first partitioned table may include rows 1-50 of the original table, and the second partition table may include rows 51-100 of the original table.

In certain instances, as a system (e.g., system 100) collects increasing amount of data, additional rows may be added to the table storing the data. A partitioning strategy may be employed so that as existing data storage or memory nodes are exhausted (e.g., full, or completely occupied), the table is partitioned, with the divided parts stored in additional data storage or memory nodes, while still maintaining a logical structure so that the divided parts may be located when data contained therein needs retrieval. Similarly, should the amount data stored in the table shrink, or if computing resources shifts, one or more nodes may be removed.

In some embodiments, each node (such as node 312a or 312b) may contain a plurality of data tables, the tables may store transaction logs previously described. For example, node 312a contains tables 314a, 316a, and/or 318a, and node 312b contains tables 314b, 316b, and/or 318b. In some embodiments, tables 314a and 314b may be related by a partition strategy, tables 316a and 316b be related by a partition strategy, and so on. For example, table 314a may contain rows 1-50 of a dataset, while table 314b may contain rows 51-100 of the same data set. In some embodiments, table 314a contain a data set that having a logic different from table 316a and table 318a. Logic of a table, as used herein, may refer to a logic of organizing data into a table. In some embodiments, logic of organizing data into tables is based on a data category.

The data category may be determined by business needs. For example, for a particular business purpose, data related to users may be category of data (e.g., user data), data related to product may be another category of data (e.g., product data), and so on. For example, system 100 may track the deliveries of ordered items. Thus, each time a delivery is completed by a delivery worker (e.g., 224A or 224B) and marked completed in system 100, new data regarding delivery may be generated and recorded in a transaction log stored in a table (such as table 314a). In another example, system 100 may track number of purchases completed on its platform, and each purchase may generate a new data point to be recorded in another transaction log and stored in another table (such as table 316a). In yet another example, system 100 may track a number of user interactions with a particular system event (e.g., sales event, new system feature, new products, etc.), and each user interaction may generate a new data point to be recorded in yet another transaction log and stored in yet another table (such as table 318a). Each of table 314a, 316a, and 318a may store transaction logs of a different data category (or logic). A person of ordinary skill in the art will appreciate that the examples described are merely illustrative, and that data of different types and categories may be stored, formatted, and partitioned as desired, depending on design needs and constraints.

Streaming environment 320 may refer to the portion of system 300 for retrieving, processing, and configuring transaction logs to be viewable for streaming, such as streaming for user view as described previously. Streaming environment 320 may include a plurality of streaming nodes, such as node 322a, 322b, and so on. In some embodiments, each streaming node may represent an individual streaming thread carried out by a processor, machine, server, or virtual server or machine. For example, processing power may be shared across a plurality of processors, machines, servers, or virtual servers or machines, and the task and function of streaming may be distributed among the available computing resources. Each node, therefore, may represent one of the processors, machines, servers or virtual servers or machines, or other unit of computing resources for performing the streaming. In some embodiments, each of node 322a, 322b, and etc. may perform similar of identical function as every other node. A person of ordinary skill in the art will now appreciate that the number of nodes may be scaled up (increased) or scaled down (decreased) based on the processing demand and/or availability of computing resources.

Each streaming node may include a data source agent and a streaming process. For example, node 322a includes data source agent 324a and streaming process 326a; node 322b includes data source agent 324b and streaming process 326b, and so on. As described previously, each streaming node may function largely identical to other streaming nodes. Therefore, only node 332a is described in detail below for ease of understanding.

In some embodiments, data source agent 324a is configured to retrieve transaction logs from one or more database nodes of partitioned databases 310. For example, data source agent 324a may retrieve transaction logs of table 318a from node 312a, transaction logs of table 318b from node 312b, and so on. In some embodiments, data source agent 324a may communicate with registry 330, and may be configured to retrieve translation logs based on the communication. In some embodiments, data source agent 324a may compile modified transaction logs. The modified transaction logs may be compiled based on the retrieved transaction logs. Operations and processes of performed by data source agent 324a are described in detail below with reference to FIG. 4 and FIG. 5.

In some embodiments, streaming process 326a may stream the modified transaction log. As previously described, streaming process 326a may be configured to handle any changes in the relevant data in real-time, in between the batch processing. Example of streaming process 326a may be performed by applications such as Apache Flink. In some embodiments, modified transaction logs may be stored in a databases, such as in table 342 of destination database 340.

Figure 4:
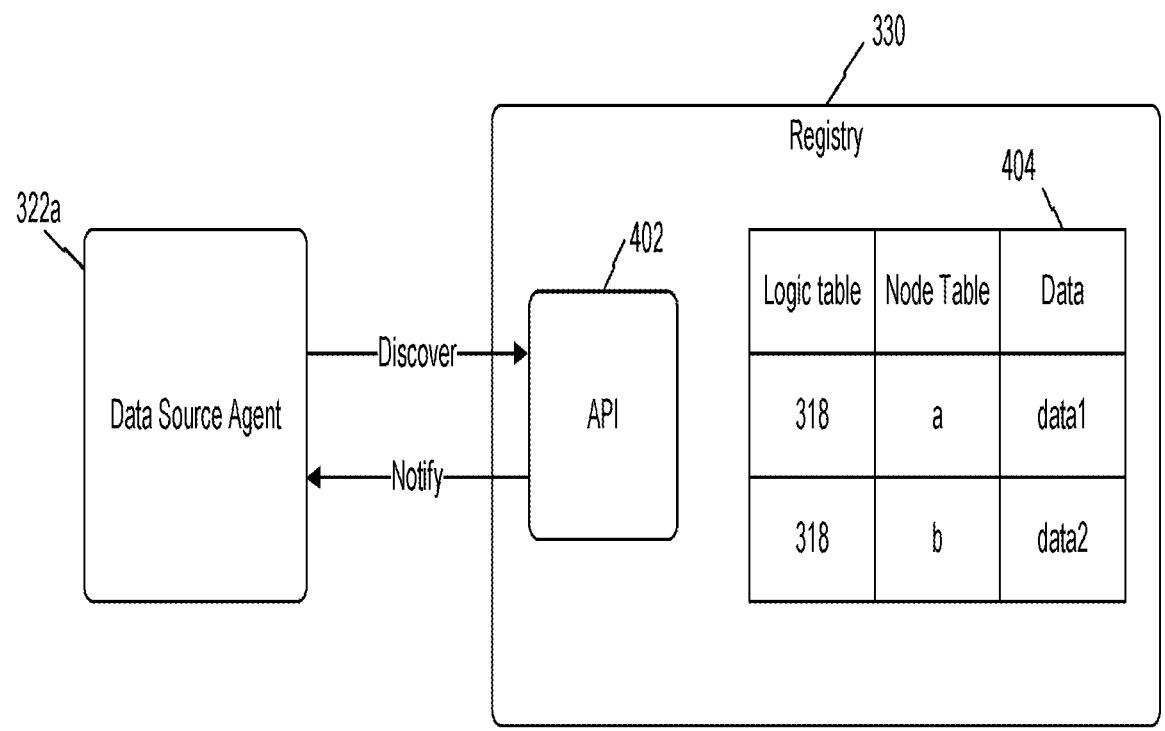
FIG. 4 is a schematic diagram of an exemplary registry, consistent with the disclosed embodiments.

FIG. 4 is a schematic diagram of an exemplary registry 330, consistent with the disclosed embodiments. Registry, as used here in, refers to programming or module that stores the address, location, or distribution of data tables. For example, table 314a may be an example of a data table. Registry 330 is configured to aid data source agents (e.g., data source agent 324a) to locate and retrieve a particular data table. In some embodiments, registry 330 may include an application programming interface (API) 402, and address 404. API may refer to programming, functions, or algorithms or managing or maintaining interaction between two or more software applications. By way of example API 402 may mange the communications between registry 330 and data source agent 324a. Data source agent 324a may send a 'Discover' query to API 330 seeking to locate a data table, API 330 may receive the "Discover' query, and process it by locating an address of the data table containing the transaction logs being sought, and return this information as 'Notify' to data source agent 324a.

In some embodiments, when streaming process 326a is streaming data relating to a particular logic (category of data), it may first need to declare a source of data (e.g., locating where transaction logs are stored). For example, this may involves describing address of database, gaining authorization and authentication to access data stored thereon, and providing scripts or command for loading of data (such as transaction log). Additionally, or alternatively other steps may be required to identify and retrieve data needed from streaming. When the transaction logs are stored in tables of partitioned databases, streaming process 326a cannot easily declare the source of data because that data may be spread across potentially hundreds or thousands of tables. Moreover, as the number of nodes in partitioned databases 310 changes, the address of the transaction logs may change as well, and streaming process 326a may not be able to adapt to this change without manual rebuilding the software module (e.g., declaring new/updated sources of data). Thus, in some embodiments, streaming process 326a may rely on data source agent 324a to declare the source of data. By sending a "Discover" query, data source agent 324a provides to API 402 the specific transaction logs that streaming process 326a requires. API 402 may locate this transaction log in address 404. Once the transaction log is located, API 402 sends the address of the transaction log in terms of logic and node of the table containing the transaction logs needed, which data source agent 324a uses to retrieve these transaction logs.

Address 404 may refer to an updated collection of locations of the plurality of data tables in partitioned databases 310. As described previously, in an operating environment in which data tables stored are often partitioned from time to time, nodes can be created or removed. Address 404 may allow system 300 to adapt to any changes in partitioned databases 310 automatically without needing to manually rebuild a streaming process (e.g., 326a) to accommodate database changes. Address 404 may include mapping or distribution of the data tables in the partitioned databases 310, serving as an index like function for data source agent 324a to locate transaction logs. In some embodiments, address 404 may be organized by logic and nodes. Logic may be business logic such as data type or category as described previously, and nodes may refer to nodes of partitioned databases 310 as depicted in FIG. 3. For example, depicted in FIG. 4, address 404 includes a data table "data1" having logic of "318" and node of "a," (thus would be 318a), and a data table "data2" having logic "318" and node of "b" (thus would be 318b), and so on. Thus, when system 300 creates registry 330 and updates address 404 as the nodes and tables in partitioned databases 310 change, no additional change or modification is required on the part of data source agent 324a or streaming process 326a even when the partitioned databases 310 undergoes further partitioning.

Registry 330 is not limited to a single registry. For example, system 300 may create multiple registries, each being communicatively coupled to one or more data source agents (such as data source agents 324a and/or 324b). In some embodiments, multiple registries are hosted or stored in distributed systems or storages. The distributed storages may be consistent distributed storage. For example, if multiple versions or registry 330 exists, it is desirable that when any of the data source agents communicate with any of the registries, the resultant communication would be consistent and/or identical.

Figure 5:
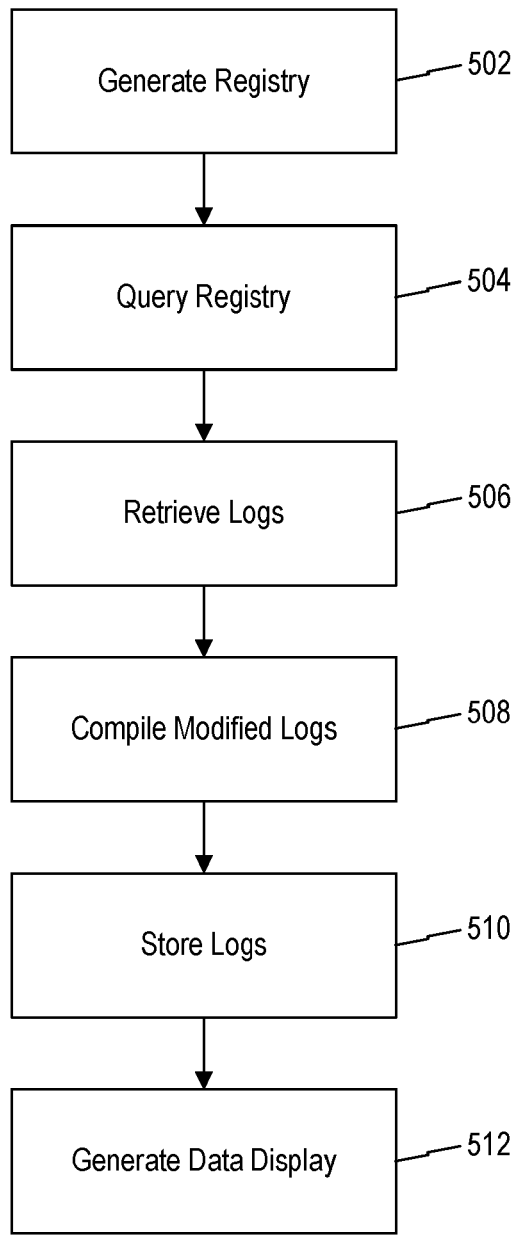
FIG. 5 is a flow chart of an exemplary process for multi-nodal stream processing framework for partitioned databases, consistent with the disclosed embodiments.

FIG. 5 is a flow chart of an exemplary process for a multi-nodal stream processing framework for partitioned databases, consistent with the disclosed embodiments.

In step 502, system 300 may generate registry 330. In some embodiments, generating registry 330 may include initially creating the registry, such as initially building address 404. Additionally, generating registry 330 may also include updating address 404 with changes in partitioned database 310, such as when data tables are partitioned, or nodes are added or removed. For example, if data in a table is partitioned to a different node, address table 404 is updated accordingly. In some embodiments, API 202 updates data source agents (such as data source agent 324a) with a corresponding change in the distribution of the at least one first data table in response to a change in the partition strategy. For example, through the "Discover" and "Notify" communications previously described updates in partition strategy of partitioned databases 310 can be communicated to data source agent 324a.

In step 504, data source agents, such as data source agent 324a, may query registry 330. In some embodiments, when a user desires to stream a particular set of transaction logs, data source agent 324a may attempt to locate the data table source containing the transaction logs required for the streaming, by querying registry 330. In some embodiments, querying registry 330 includes identifying the distribution of the one or more first data table based on the set of logic tables and node tables (such as address 404). By way of example, data source agent 324a may send "Discover" communication to API 402 of registry 330. API 402 may process this communication and search for a relevant result in address 404. Once the desired data table is found, API 402 may send the distribution (e.g., the address from address 404) of the one or more first data table by returning the result of the query to data source agent 324a in a "Notify" communication. For example, data source agent 324a may seek a transaction log for nth number users clicking on a banner ad on a website associated with system 100, by sending "Discover" communication to API 402. API 402 may, using one or more search algorithms or functions and address 404, locate the table in the partitioned databases 310 containing the transaction log sought. API 402 may send the address of the table (e.g., 318a, which includes the logic and node) to data source agent 324a.

In step 506, data source agent 324a may retrieve transaction logs from data tables of partitioned databases 310. The data tables may be identified in step 504. For example, if API 402 notifies data source agent 324a that the desired transaction logs are in table 318a (e.g., having logic of "318" and is located in node "a"), data source agent 324a would retrieve the desired transaction logs from node a in table 318a.

In step 508, data source agent 324a may compile modified transaction logs based on the transaction logs retrieved. In some embodiments data source agent 324a may generate a modified transaction log by merging transaction logs from the different data tables into a single table, such as table 342 depicted in FIG. 3. In some embodiments, the transaction logs may be merged by the corresponding logic. For example, after data source agent retrieves table 314a from node a, and table 314b from node b, and so on, it may merge all of the tables having the same logic (e.g., 314) into a single table. Thus, for example, 314a, 314b, and 314c may be merged into a single "314" table, which is stored in database as table 342, which may represent a compiled modified transaction log In some embodiments, data source agent 324a may append transaction logs to include logic and node in address 404. For example, modified transaction log may append logic and node to the translation log. For instance, an illustrative transaction log may be "customer_order_1", "customer_order_2", the entry in the modified transaction log may be "318_a_customer_order_1" or "318_a_customer_order_1." By appending logic and nodes to the retrieved transaction logs to create the modified transaction logs, and then merging the modified transaction logs into a single table organized by logic, streaming process 326a that may still contain legacy programming or code unsuited for partitioned databases 310 may continue to operate without manual rebuilding. A person of ordinary skill in the art will appreciate that by merging the different data tables from different nodes of partitioned databases 310, all transaction logs having the same logic would be located in a single location. Therefore, from the point of view streaming process 326a, the modified transaction logs do not appear to be located in different and constantly changing nodes. Thus, no reprogramming or recoding would be necessary even if nodes are added or removed in partitioned databases 310. In some embodiments, data source agent 324a may further append a time stamp to the entry in the transaction log. For example, by appending a time stamp to the retrieved transaction logs to generate modified transaction logs, the new created table (such as table 342) may organized the modified transaction logs by chronology of the time stamps. The time stamp may be the time that the transaction log is generated by system 100.

In step 510, optionally, streaming process 326a may store the compiled modified transaction log in destination database 340. For example, the modified transaction logs may be stored in table 342. In some embodiments, database 340 may not be a partitioned database.

In step 512, streaming process 326a may generate a data display. As described previously, streaming process 326a may compile changes in data for display to a user. These changes may be tracked via the modified transaction logs. Streaming process 326a may be implemented with data streaming programs, such as Apache Flink. For example, when streaming process 326a streams transaction logs relating to user interaction with a particular system feature of system 100 (e.g., sales event, new system feature, new products, etc.), data points related to the user interaction may be viewed in real-time. In addition, these transaction logs may be converted into useful visualizations (such as charts, graphs, animation, or other types of visual aids) to be displayed to a user. Additionally, or alternatively, transaction logs may be compiled into reports, such as a metric report. A metric report may refer to a report containing a description about a subject. As used herein, the metric report may be a report summarizing the history of streamed data, performances of the systems and modules for streaming data, and other underlying analysis and/or pattern of the streamed data. In some embodiments, the metric report may be compiled by system 300 by utilizing data manipulation algorithms, such as combining two or more tables; summing, finding a maximum, or averaging data of the transaction logs; sorting or ordering the tables; filtering the transaction logs by some criteria, or the like.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for generating a data transaction log, the system comprising:
    at least one storage storing at least one data table, the at least one data table including at least one transaction log and being associated with nodes; and
    at least one processor configured to execute the steps of:
        generating a registry, the registry comprising an application programing interface (API) and an address of the at least one data tables; and
        maintaining at least one data source agent, each data source agent being configured to:
            query the registry to receive the address of the at least one data tables;
            request, with the address of the at least one data tables, for the at least one transaction log, from the at least one storage;
            receive the at least one transaction log from at least one storage, wherein each transaction log is associated with a transaction time; and
            generate one or more modified transaction logs.

2. The system of claim 1, wherein the at least one storage is a horizontally partitioned database characterized by a partition strategy and the nodes.

3. The system of claim 2, wherein generating the registry comprises generating a set of logic tables and node tables based on the partition strategy of the at least one storage.

4. The system of claim 3, wherein querying the registry comprises identifying the distribution of the one or more data table based on the set of logic tables and node tables.

5. The system of claim 4, wherein the received transaction logs are associated with the at least one data tables.

6. The system of claim 5, wherein generating one or more modified transaction logs comprises:
    identifying all of the received transaction logs having same value in the logic tables; and
    merging the identified transaction logs in the one or more modified transaction logs, wherein each entry in the modified transaction logs is ordered by the transaction time.

7. The system of claim 4, wherein the API of the registry is configured to update the at least one data source agent with a corresponding change in the distribution of the at least one data table in response to a change in the partition strategy.

8. The system of claim 1, wherein the API is configured to receive a query from the at least one data source agent and to send the distribution of the one or more data table, wherein the distribution is characterized by a logic table and a node table.

9. The system of claim 1, wherein the registry comprises multiple registries executed on distributed machines with consistent distributed storages.

10. The system of claim 9, wherein each of the multiple registries is coupled to communicate with the one or more data source agents.

11. A method for generating data transaction log, the method comprising:
    generating a registry, the registry comprising an application programing interface (API) and an address of at least one data tables;
        wherein the at least one data tables include at least one transaction log and being associated with nodes; and
        wherein the at least one data tables are stored in at least one data table;
    maintaining at least one data source agent, each data source agent being configured to:
        query the registry to receive the address of the at least one data tables;
        request, with the address of the at least one data tables, for the at least one transaction log, from the at least one storage;
        receive the at least one transaction log from at least one storage, wherein each transaction log is associated with a transaction time;
        generate one or more modified transaction logs.

12. The method of claim 11, wherein the at least one storage is a horizontally partitioned database characterized by a partition strategy and the nodes.

13. The method of claim 12, wherein generating the registry comprises generating a set of logic tables and node tables based on the partition strategy of the at least one storage.

14. The method of claim 13, wherein querying the registry comprises identifying the distribution of the one or more data table based on the set of logic tables and node tables.

15. The method of claim 14, wherein the received transaction logs are associated with the at least one data tables.

16. The method of claim 15, wherein generating one or more modified transaction logs comprises:
    identifying all of the received transaction logs having same value in the logic tables; and
    merging the identified transaction logs in the one or more modified transaction logs, wherein each entry in the modified transaction logs is ordered by the transaction time.

17. The method of claim 14, wherein the API registry is configured to update the at least one data source agent with a corresponding change in the distribution of the at least one data table in response to a change in the partition strategy.

18. The method of claim 11, wherein the API is configured to receive a query from the at least one data source agent and to send the distribution of the one or more data table, wherein the distribution is characterized by a logic table and a node table.

19. The method of claim 11, wherein the registry comprises multiple registries executed on distributed machines with consistent distributed storages.

20. The method of claim 19, wherein each of the multiple registries is coupled to communicate with the one or more data source agents.

* * * * *